April 28, 1936.  B. E. MILLS  2,039,020
COIN CONTROLLED WEIGHING AND TICKET PRINTING SCALE
Filed April 13, 1931  8 Sheets-Sheet 6
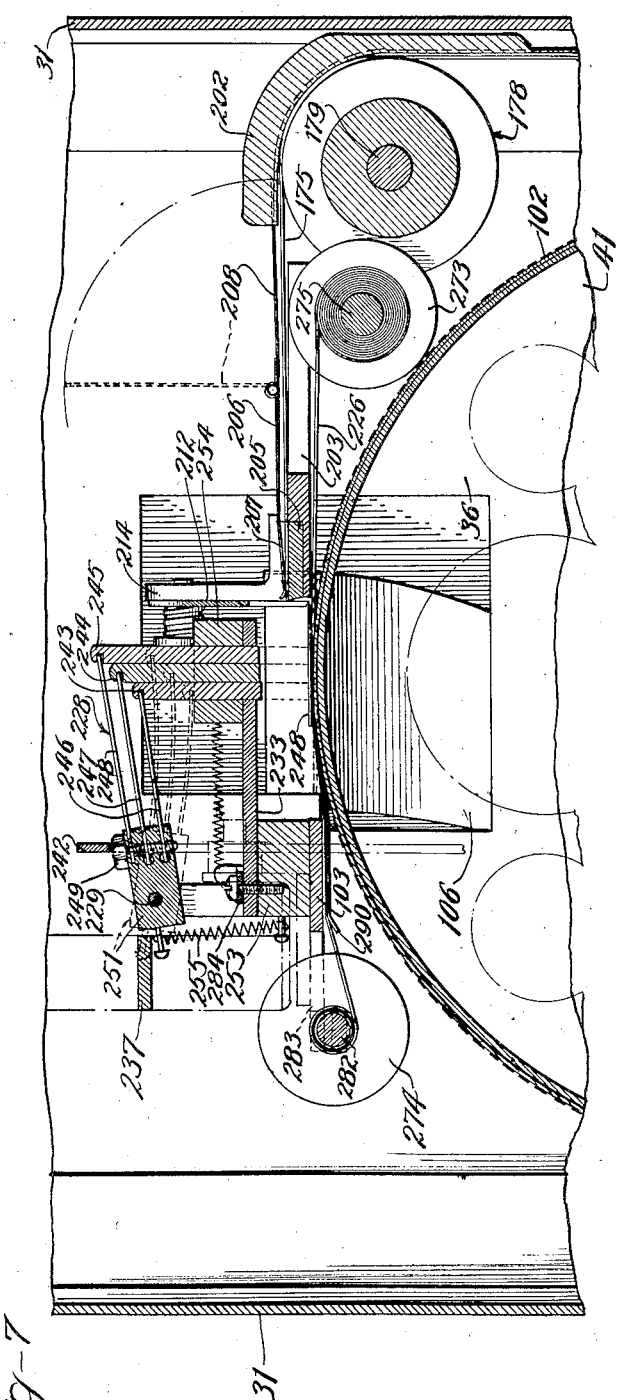
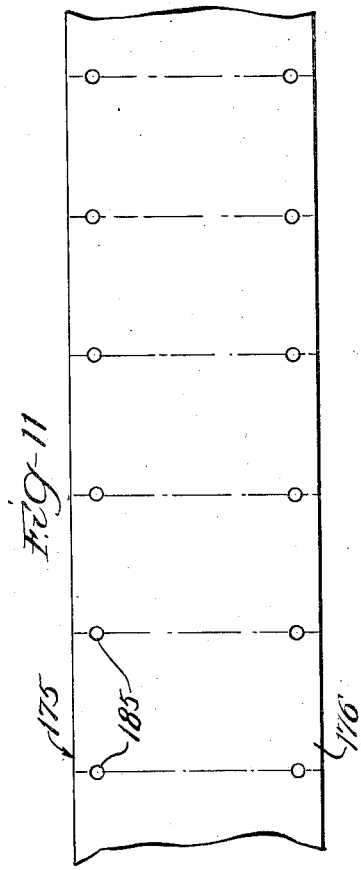
Inventor
Bert E. Mills
By: Carl J. Lloyd
Atty.

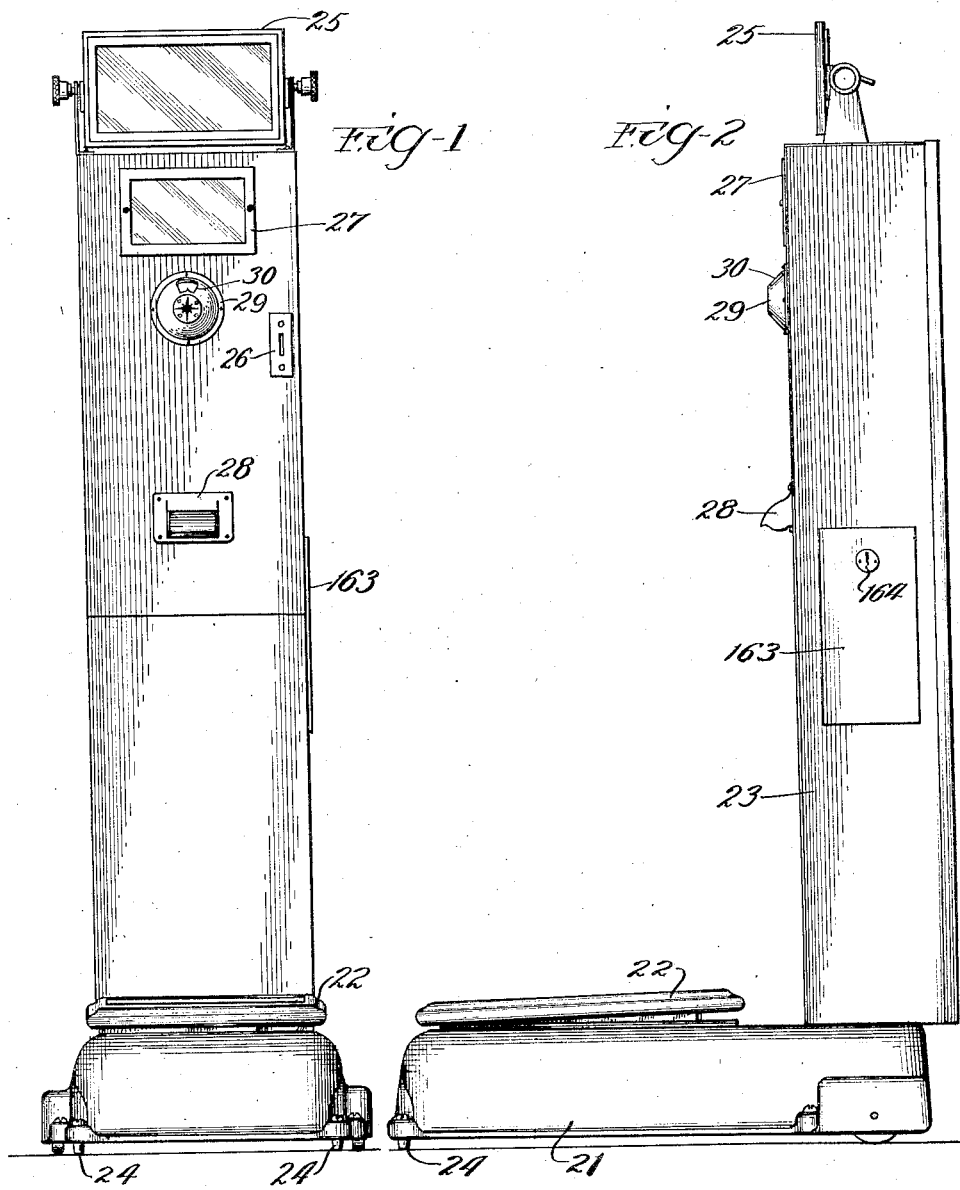

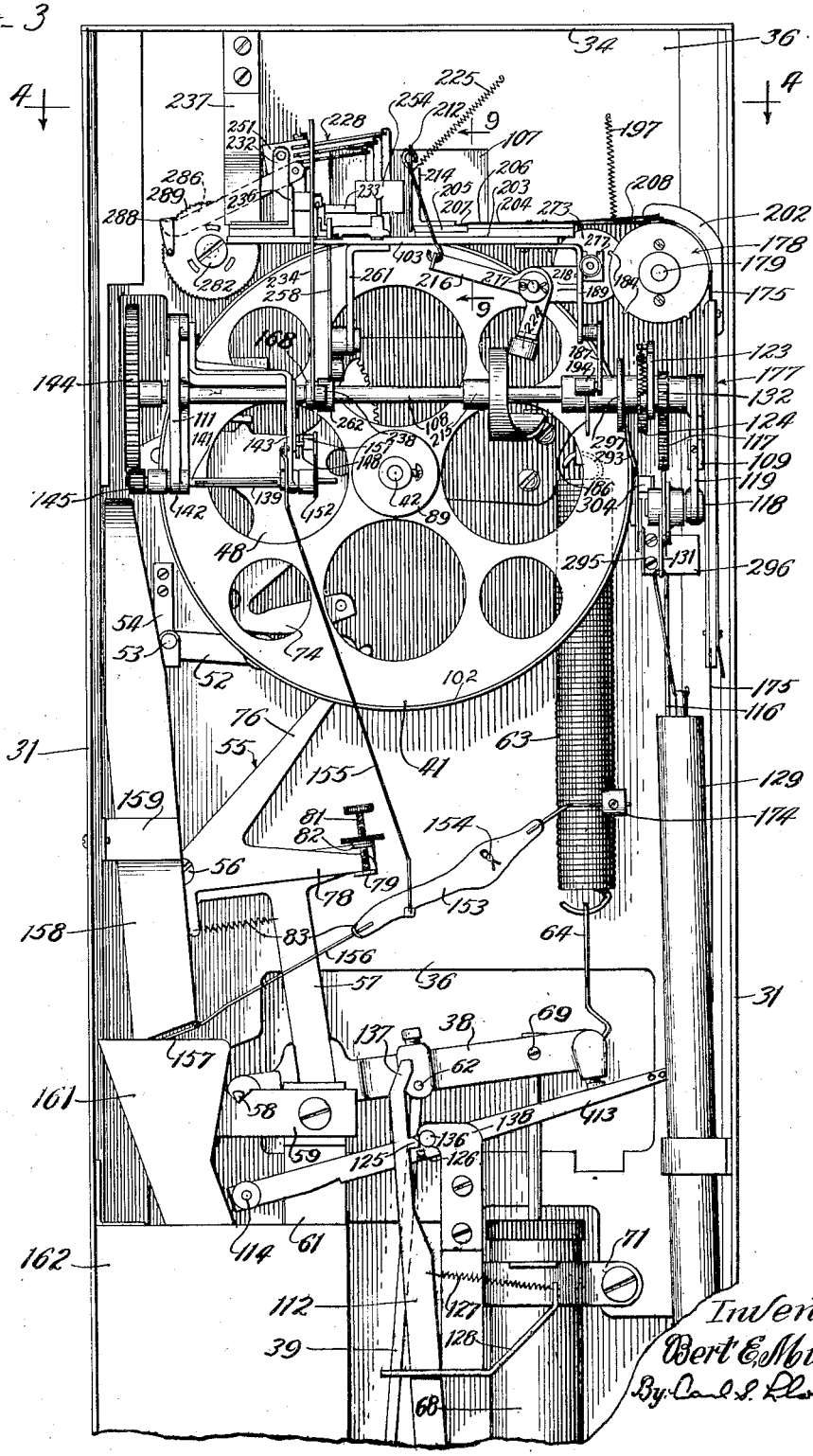

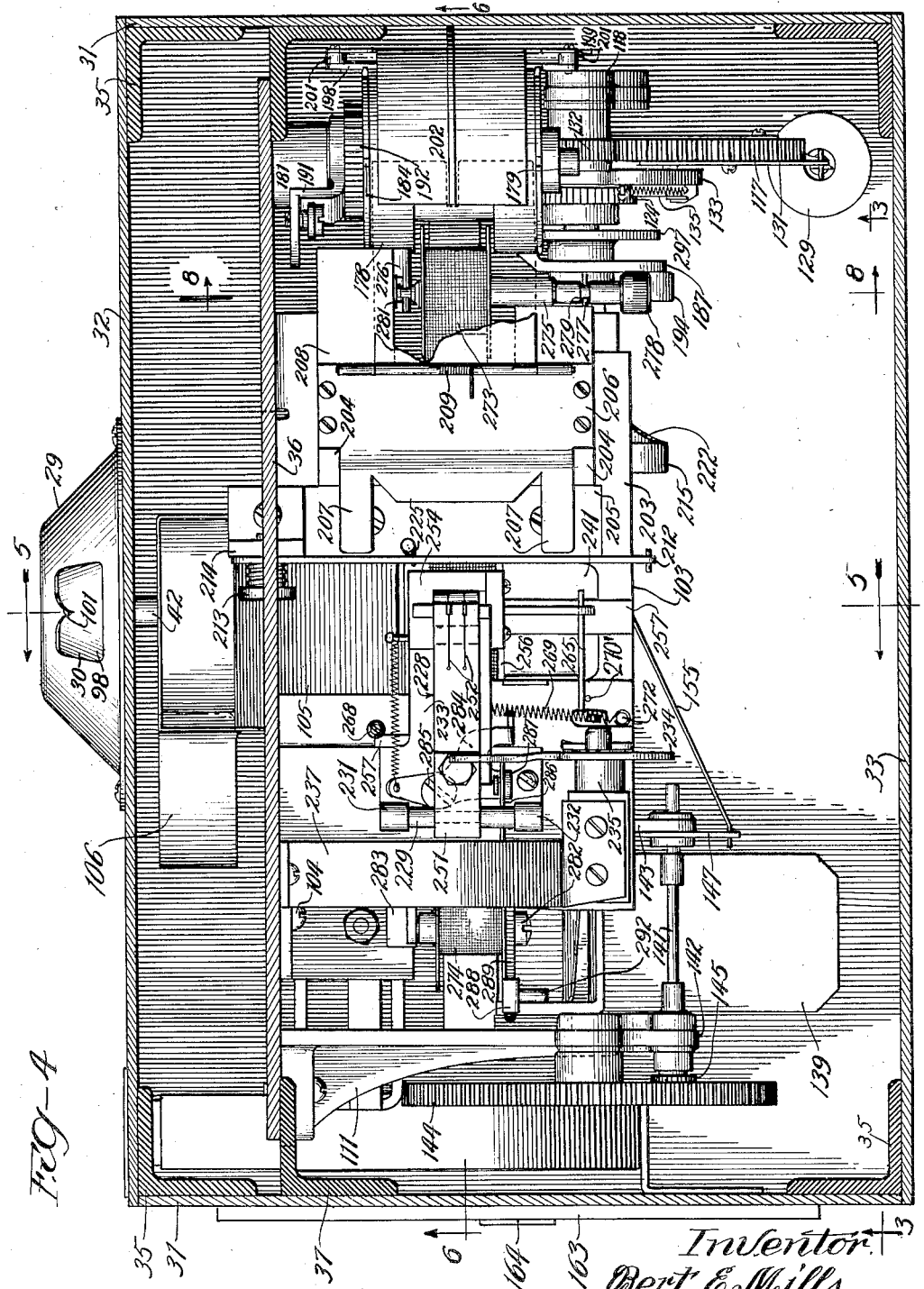

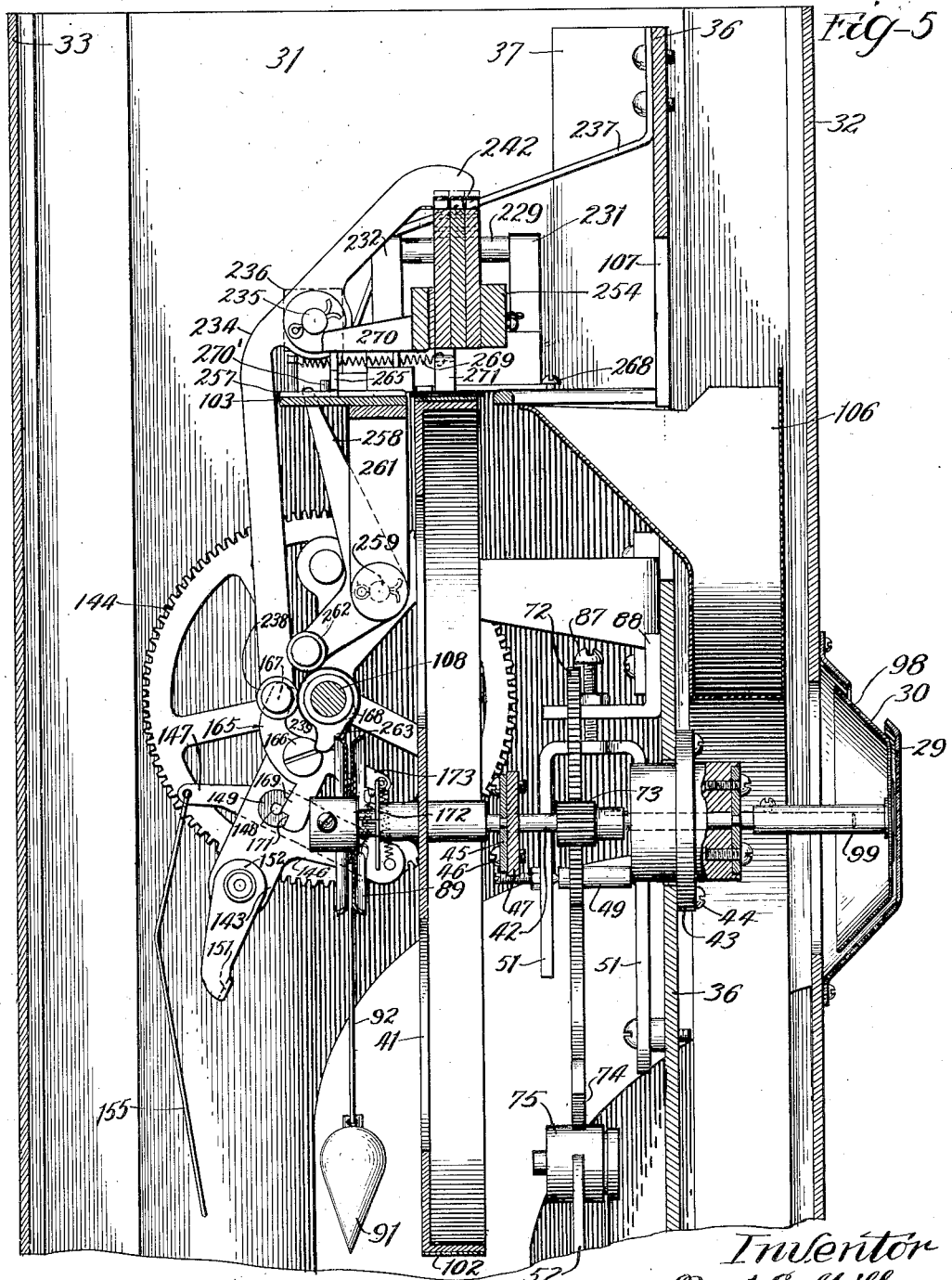

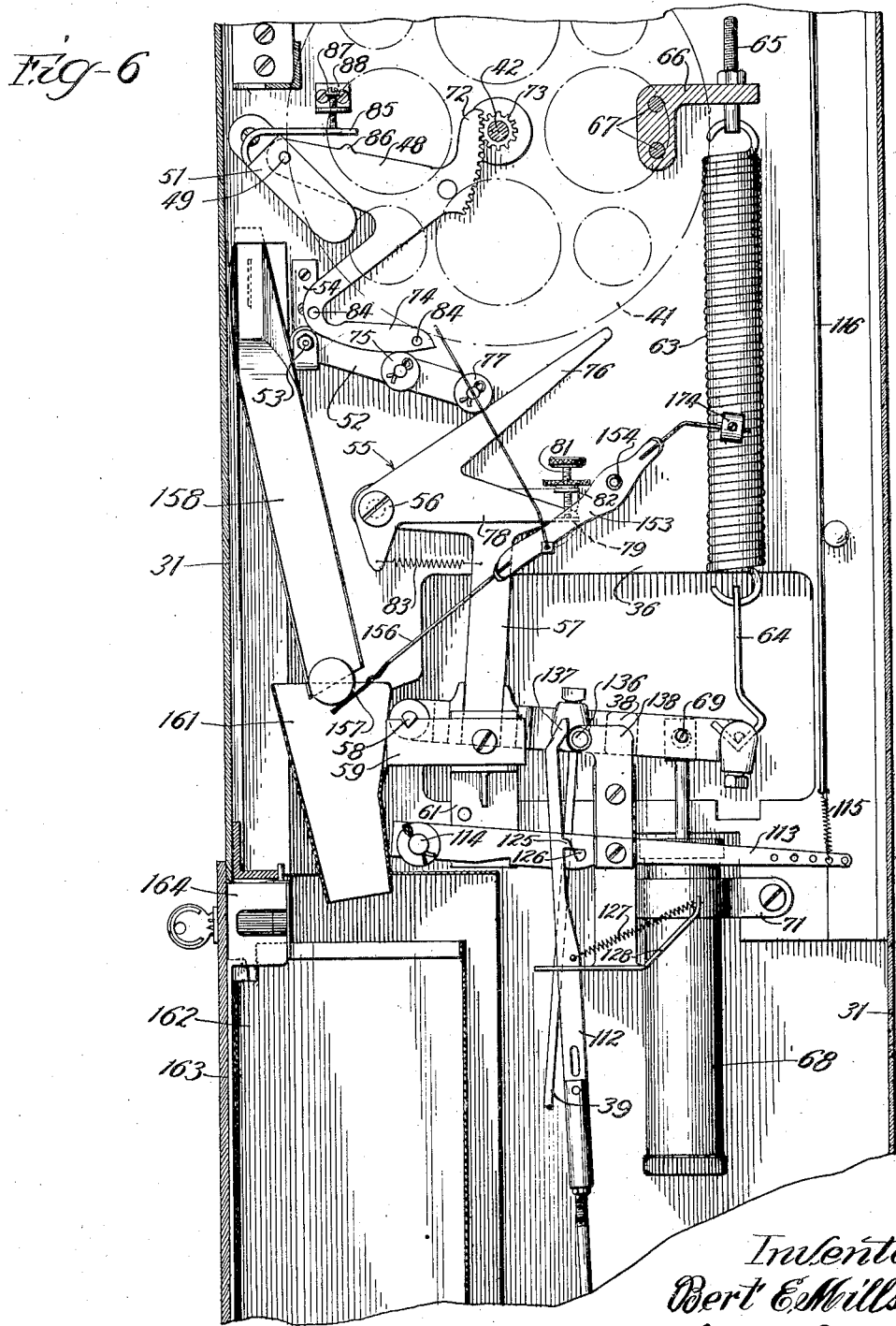

April 28, 1936. B. E. MILLS 2,039,020
COIN CONTROLLED WEIGHING AND TICKET PRINTING SCALE
Filed April 13, 1931 8 Sheets-Sheet 7
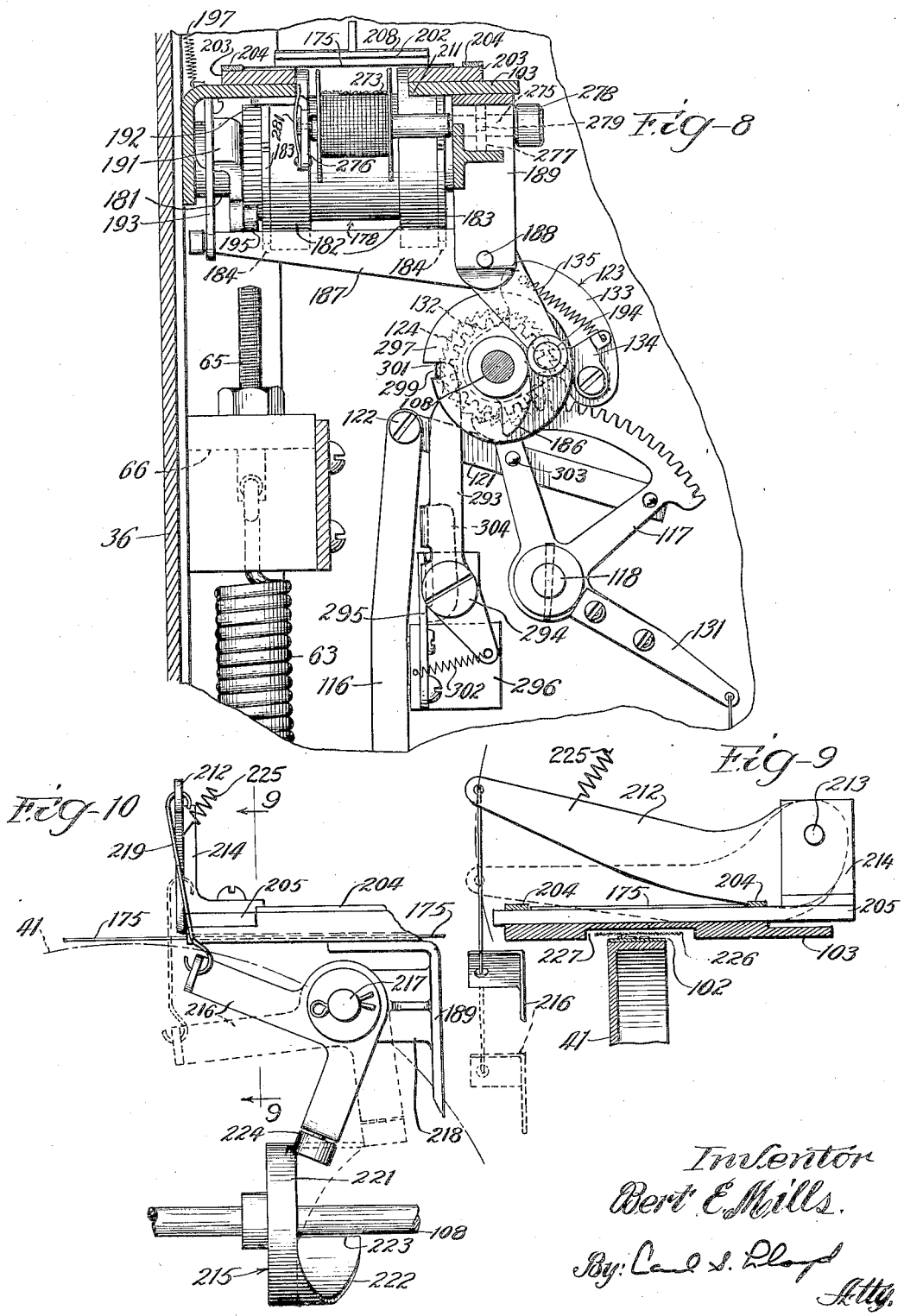

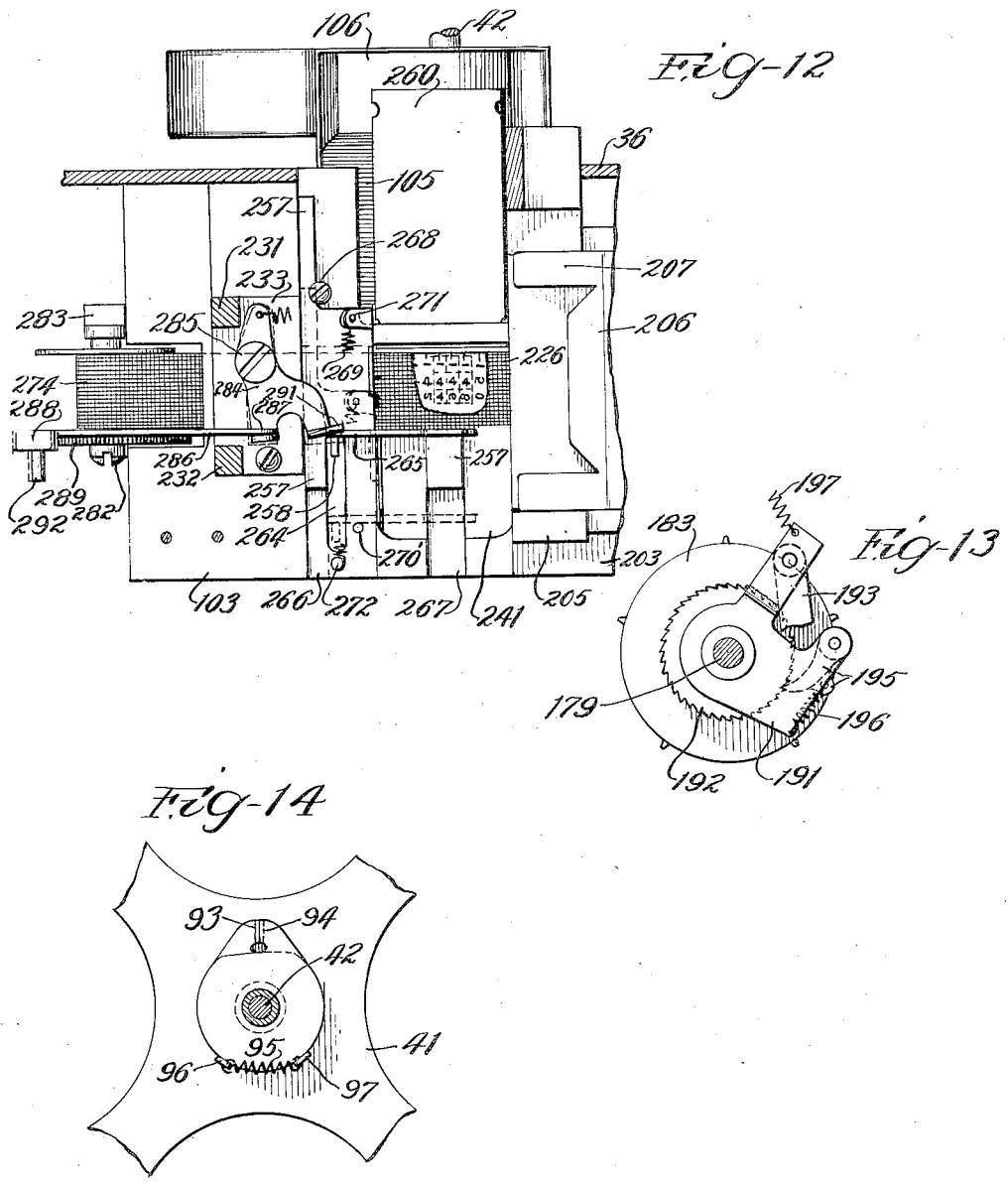

Patented Apr. 28, 1936

2,039,020

UNITED STATES PATENT OFFICE 2,039,020

COIN-CONTROLLED WEIGHING AND TICKET PRINTING SCALE

Bert E. Mills, Oak Park, Ill., assignor to Mills Novelty Company, Chicago, Ill., a corporation of Illinois Application April 13, 1931, Serial No. 529,729

17 Claims. (Cl. 265—9)

This invention relates to coin-operated weighing scales which record the weight of the person by printing on a ticket which is automatically ejected from the machine upon the completion of the weighing operation. The scale provided by the invention is of the type which is operated by power supplied by the weight of the person on the weighing platform, mechanisms being provided for storing up power thus supplied to actuate devices for positioning a ticket to be printed, printing the ticket, and finally ejecting the printed ticket.

An important object of the invention is to provide an improved mechanism for accurately and positively timing the several operations involved in the recording of the individual's weight on the ticket.

Another object of the invention is to provide an impression hammer which is so constructed as to press the ticket against the printing wheel in such a manner as to make the ticket conform to the curvature of the wheel and to any unevenness in the surface of the type, thereby effecting uniform printing.

Another object of the invention is to provide a wind-up mechanism which is preliminarily set to operative position by movement of the weighing platform before the weighing mechanism is actuated, means being provided for then disconnecting the wind-up mechanism from the weighing platform, thereby avoiding any inaccuracy in the operation of the weighing mechanism by reason of friction which might be caused were it not entirely freed from the wind-up mechanism.

Another object of the invention is to provide ticket severing or detaching means which operates to cut the end ticket from the strip before the printing mechanism comes into play, the severed ticket being thus free to be impressed against the printing wheel to effect uniform printing without interference from the remaining tickets of the strip.

A further object of the invention is to provide for a convenient and compact arrangement of the ticket feeding, severing, printing, and ejecting mechanisms, whereby access may be readily had to these several instrumentalities to make any adjustments or replacements which may be necessary.

Further objects and advantages of the invention will be apparent from the following detailed description, which, taken in connection with the accompanying drawings, discloses a preferred embodiment thereof.

Referring to the drawings:

Fig. 1 is a front elevational view of the scale;

Fig. 2 is a side elevational view of the scale;

Fig. 3 is a rear elevational view of the upper portion of the scale, taken as indicated by line 3—3 of Fig. 4, the several parts being shown in the positions which they assume before a person steps on the weighing platform;

Fig. 4 is a top plan view of the weighing and printing mechanism, taken as indicated by line 4—4 of Fig. 3;

Fig. 5 is a central vertical section through the weighing and printing mechanism, the section being taken on line 5—5 of Fig. 4;

Fig. 6 is a vertical section, taken on line 6—6 of Fig. 4, the parts being shown in the position assumed when the printing wheel has been turned to printing position and a coin has been introduced to release the mechanism which controls the printing of the ticket.

Fig. 7 is a detail section of the printing mechanism showing the path of movement of the impression hammer relative to the printing wheel, the actuated position of the impression hammer being shown in dotted lines;

Fig. 8 is a detail section showing portions of the wind-up and ticket feed mechanisms, the section being taken as indicated by line 8—8 of Fig. 4;

Fig. 9 is a detail section of the ticket cut-off blade, the section being taken on line 9—9 of Figs. 3 and 10;

Fig. 10 is a rear elevational view of the ticket cut-off mechanism;

Fig. 11 is a view of a portion of the ticket strip;

Fig. 12 is a top plan view of the ticket ejecting mechanism, the ribbon take-up spool, and the means for turning said spool;

Fig. 13 is a detail of the pawl and ratchet drive for the ticket feeding spool;

Fig. 14 is a detail of the connection between the printing wheel and the printing wheel shaft; and Fig. 15 is a view of a portion of the type strip carried by the printing wheel.

Before presenting a detailed description of the mechanism, a brief statement of the main operations involved will be given. When a person steps on the weighing platform a wind-up mechanism is actuated by the tilting of the platform, the power thus supplied by this preliminary movement of the platform being employed to raise a weight which drives the various mechanisms which cooperate to record the weight on the ticket. After this setting of the wind-up mechanism has been completed, further movement of the platform actuates the weighing mechanism of the scale which brings a printing wheel to position to give the correct weight of the individual on the platform. After the printing wheel has been brought to proper position a coin is introduced to release the mechanism which controls the printing of the ticket. The several steps involved in the printing of the ticket are timed by the movement of a main timing shaft which is turned by the lowering of the weight. Immediately upon the release of the timing shaft by the introduction of a coin, a ticket strip is first advanced the width of one ticket, which brings the ticket at the end of the strip into position on the printing wheel. As soon as the end ticket has been thus shifted into position for printing, a cut-off blade is actuated to sever it from the strip. Immediately upon the severing of the ticket a printing hammer is brought against the ticket to effect the printing. The printing being completed, a push-out slide is then actuated to eject the ticket into a discharge chute, this final operation being accompanied by the advance of a take-up spool upon which the type ribbon is wound. These several steps involved in the printing operation being completed, the timing shaft is locked against further movement until the next coin actuation of the machine. The wind-up mechanism, however, is free for the next preliminary setting as soon as another person steps on the scale.

Referring first to the general views shown in Figs. 1 and 2, the scale consists of a base 21 which affords a support for a weighing platform 22, and an upright 23 secured to the rear portion of the base in any suitable manner. The base consists of a hollow metal housing in which is contained a suitable weighing frame to which the platform 22 is secured, the platform being adapted to pivot about its forward edge under the weight of a person from the inclined position, shown in Fig. 2, to a substantially horizontal position. As will presently be explained this initial tilting movement of the platform is designed to store up power for operating the mechanisms which print the ticket. The base portion of the scale is not shown in detail inasmuch as weighing frames operated by a portion of the weight of the individual to store up power preliminary to the weighing operation are known in the art.

The base 21 may be provided with casters 24. An adjustable mirror 25 is provided on the upper end of the upright 23, and on the front wall of said casing is provided a coin slot plate 26, a plate 27 upon which are printed the directions for operating the machine, and a catch pocket 28 into which the printed ticket is discharged for removal by the operator. A dial cover plate 29, provided with an opening 30, exposes for view an index dial, which, as will presently be explained, indicates the proper time to insert a coin to obtain a correct weighing.

The upright 23, as shown in Figs. 3 and 4, comprises a rectangular housing consisting of side walls 31, a front wall 32, a back wall 33, and a top cover plate 34. The adjoining edges of these walls are reinforced by vertical angle bars 35. The major portion of the weighing and printing mechanism is supported between the side walls 31 on a plate 36, the upper edge of which is flush with top wall 34 and the opposite vertical edges of which are rigidly secured to side walls 31 by vertical angle bars 37. The weighing mechanism will first be described after which the various devices which cooperate to record the weight on the ticket will be described.

The weighing mechanism is shown in Figs. 3 and 6, Fig. 3 representing the position of the parts when no weight is on the weighing platform, and Fig. 6 representing the position of the parts after a person has stepped on the platform and has inserted a coin in the machine. This mechanism comprises: a horizontally disposed weighing beam 38, which is actuated from the weighing platform by a pull rod 39; a printing wheel 41, mounted on a shaft 42, which is journaled near one end in a bearing 43, secured by screws 44 to plate 36, and journaled near the other end in a bearing plate 45, the latter being secured by bolts 46 to a bracket arm 47 which is supported from plate 36 (Fig. 5); a cam segment 48, pivoted at 49 on a channel bracket 51 carried by plate 36; a roller arm 52, pivoted at 53 in a bracket clip 54 carried by plate 36; and a lever 55, pivoted at 56 on a bracket 57 carried by weighing beam 38.

The weighing beam 38 is provided at one end with a knife edge 58, one end of which rests on an arm 59 which is supported on a second arm 61 carried by plate 36, the other end of said knife edge being supported on a similar arm (not shown) secured to the outer face of plate 36. The upper end of pull rod 39 is pivoted at 62 to beam 38, the lower end of said rod connecting through suitable levers to the weighing frame contained in the base of the scale. The downward pull imparted to the weighing beam through rod 39 is resisted by a heavy coil spring 63, the lower end of which is connected through a hook 64 to the free end of beam 38 and the upper end of which is hooked through the eye of an adjustable bolt 65 carried by a bracket 66, said bracket being connected by bolts 67 to plate 36. A dashpot 68, the plunger of which connects at 69 to the weighing beam 38, cushions the return of the weighing beam to normal position under the action of spring 63 when the person steps off the platform. The dashpot is supported from plate 36 by a yoke band 71. It will be apparent that the extent of movement of the weighing beam against the tension of spring 63 will be determined by the downward displacement of pull rod 39, which in turn depends upon the weight on the platform.

The movement of the weighing beam is used to position the printing wheel 41, this adjustment being effected through the parts 48, 52, 55, and 57, said parts affording a yielding connection (through a spring 83 to be later described) between the printing wheel shaft 42 and weighing beam 38. Cam segment 48 carries a toothed rack 72 which meshes with a pinion 73 rigidly secured to printing wheel shaft 42. Segment 48 tends to turn about pivot 49 under its own weight in a clockwise direction, viewing Fig. 6, the lower portion thereof being in the form of a cam arm 74 which rests on a roller 75 carried by roller arm 52, the latter, in turn, resting on lever 55, the upwardly extending arm 76 of which engages a roller 77 carried by the free end of arm 52. A second arm 78, forming a part of the lever 55, carries a lip 79 which engages the end of an adjusting screw 81, the latter being threaded in a lip 82 carried by bracket 57. Lever 55 is thus adjustably connected through the pivot 56 with bracket 57. A coil spring 83, connected at one end to lever 55 and at the other end to bracket 57, yieldingly holds lip 79 against the lower end of adjusting screw 81. This adjustable connection between lever 55 and bracket 57 affords means for regulating the position of the parts so that when no weight is on the platform the printing wheel 41 will be at its zero position.

The curvature of the lower edge of cam arm 74 is such as to insure turning of the printing wheel shaft 42 through equal distances for equal increments of weight. This arm may be adjusted by being bent toward or away from the main body portion of cam segment 48 by means of a wrench placed in openings 84. A stop arm 85, carried by channel bracket 51, engages a lug 86 on the upper edge of cam segment 48 to hold the latter at zero position after the weight has been removed from the platform and the weighing beam has returned to normal position under the action of spring 63. This stop arm may be adjusted by means of a set screw 87 carried in a bracket 88 which is secured to the inner face of plate 36. It will be apparent that by reason of the unbalanced nature of cam segment 48, the cam arm 74 will tend to follow the movements of roller arm 52, the movement of which, in turn, depends upon the movement of weighing beam 38. As the rod 39 pulls down the weighing beam, cam segment 48 will drop from the zero position shown in Fig. 3 to the weighing position shown in Fig. 6, this movement in turn imparting a corresponding movement of rotation to the printing wheel shaft 42, this movement of rotation being in a counter-clockwise direction, viewing Figs. 3 and 6.

Referring to Fig. 5, the rear end of printing wheel shaft 42 carries a pulley 89 from which depends a weight 91 which is supported from said wheel by a cord 92. The pulley 89 turns with printing wheel shaft 42, the purpose of the weight 91 being to prevent play between the teeth on pinion 73 and the teeth on rack 72, accurate weighing requiring that there be no play between these teeth. The weight 91 tends to turn the shaft 42 in a counter-clockwise direction, viewing Fig. 6, thereby augmenting the effect of the unbalanced condition of cam segment 42, which tends to cause said cam to follow the movements of roller arm 52.

Referring to Figs. 5 and 14, the printing wheel 41 is yieldingly connected to shaft 42, the hub of said wheel being provided with a lip 93 which engages a lip 94 carried by pulley 89. Lugs 93 and 94 are normally held in the position shown in Fig. 14 by a coil spring 95, connected at one end to a lug 96, carried by pulley 89, and at the other end to a lug 97, carried by the hub of printing wheel 41. When a weight is placed on the scale platform the printing wheel starts to turn in a counter-clockwise direction, referring to Fig. 14, by reason of the engagement between lugs 93 and 94 carried by printing wheel 41 and pulley 89, respectively. When the turning of shaft 42 has been completed by reason of the downward movement of rack 72, the inertia of the printing wheel continues to carry it ahead, this over-run being damped by spring 95 which tends to return the printing wheel in a clockwise direction until lug 93 again comes back to engage lug 94. The inertia of this return movement tends to rotate shaft 42 in a clockwise direction a slight amount, this rotational movement being damped by the weight 91. The printing wheel tends to oscillate in this manner, finally coming to rest gradually, thereby avoiding sudden impact, which might injure the moving parts of the mechanism. A circular dial 98, mounted on the outer end of a sleeve 99, which is secured to the front end of printing wheel shaft 42, oscillates with said shaft until the printing wheel comes to a position of rest. A pointer 101 (Fig. 4) formed on the edge of the opening in the dial housing 29, indicates the extent of oscillatory movement of the dial, thus showing the operator when the printing wheel is approximately at rest. If a coin is inserted before the printing wheel has reached the balanced position the weighing obviously would not be accurate.

As will presently appear, printing of the ticket is effected by forcing it against the type strip 102 (Fig. 15) secured to the periphery of printing wheel 41, the strip being provided with up-raised type numerals which indicate the weight in pounds. The printing mechanism is positioned at the top of printing wheel 41, the ticket being pressed downwardly against the type at the top of the wheel. It will be understood that when the printing wheel has reached the balanced position the number corresponding to the weight of the person on the platform will appear at the top of the wheel.

The several mechanisms which cooperate to print the ticket will now be described, reference first being had to Figs. 3 and 4. Positioned above printing wheel 41 is a bed plate 103, which projects rearwardly from plate 36, being secured thereto at its forward edge by bolts 104. The ticket strip is advanced over this plate in the direction from right to left, the end ticket being severed, printed, and finally ejected through an opening 105 in plate 103 from whence it falls into the hopper of a chute 106 which is positioned between support plate 36 and the front wall 32 of the scale casing. A portion of said hopper extends rearwardly through an opening 107 in plate 36 and registers with the opening 105 in bed plate 103. The chute 106 conducts the ticket to catch pocket 28 where it may be removed by the operator.

Positioned below and to the rear of bed plate 103 is a timing shaft 108, the rotation of which is arranged to control in proper sequence the ticket feeding, severing, printing, and ejecting devices. This shaft is journaled at its opposite ends in a pair of brackets 109 and 111 which project rearwardly from plate 36. Distributed along this shaft are a series of cam devices which actuate the feeding, severing, printing, and ejecting devices.

Power for turning shaft 108 is supplied by a wind-up mechanism now to be described, reference for this purpose being had to Figs. 3, 6, and 8. This mechanism comprises: a vertically movable wind-up pull rod 112, which is moved downwardly as the weighing platform tilts into horizontal position preparatory to actuating weighing pull rod 39; a lever 113, pivoted at 114 on plate 36, and connected at its free end through a coil spring 115 to a vertically disposed link 116; a counter-weighted wind-up gear segment 117, rotatably supported on a stub shaft 118, carried by an arm 119 which forms a part of bracket 109; a link 121, carried by gear segment 117, and pivotally connected at 122 to the upper end of link 116; a ratchet device 123 mounted for free rotation on timing shaft 108; and a ratchet wheel 124 rigidly secured to shaft 108.

In the elevated position, which is the inactive position for pull rod 112, a lug 125 carried on said rod is positioned above a stud 126 carried by lever 113. As rod 112 is lowered it is shifted to the right slightly by a coil spring 127 extending between said rod and an arm 128 carried by yoke 71. The end portion of rod 128 is provided with a slot for guiding the movements of rod 112. As rod 112 is pulled downwardly, lug 125 engages pin 126, thereby actuating lever 113 and link 116 to rotate gear segment 117, rotation of this segment serving to lift a weight 129 which is suspended from an arm 131 projecting from the hub portion of said segment.

The ratchet device 123 includes a pinion 132, the teeth of which mesh with gear segment 117. The hub portion of pinion 132 carries a curved arm 133 on which is pivoted a pawl 134 for engaging the teeth of ratchet wheel 124, a coil spring 135 extending between said pawl and the arm 133 serving to hold the former against the teeth of ratchet wheel 124. As gear segment 117 is turned in a counter-clockwise direction, viewing Fig. 8, under the action of pull rod 112, pinion 132 is turned in a clockwise direction through approximately one complete revolution, the pawl 134 riding idly over the teeth of ratchet wheel 124. The wind-up mechanism is thus placed in operative position, with the weight 129 elevated to store up power for turning timing shaft 108.

As shown in Fig. 6, as pull rod 112 reaches the limit of its downward movement, it is released from lever 113 by a roller 136 which engages a laterally bent arm portion 137 on the upper end of said pull rod, displacing the latter laterally to disconnect the tooth 125 from stud 126. Roller 136 is mounted on an arm 138 which is supported through guide arm 128 from plate 36. By thus disconnecting pull rod 112 from the wind-up mechanism, all connection between the wind-up mechanism and the weighing mechanism is eliminated, this being effected prior to actuation of pull rod 39 which connects with the weighing beam. The weighing mechanism is thus freed of any frictional resistance arising from the wind-up mechanism which might effect the accuracy of the weighing.

A governor mechanism is provided for regulating the turning of timing shaft 108 under the action of the wind-up mechanism, this being shown in elevation in Fig. 3 and in plan in Fig. 4. It consists of a fan 139, carried by a shaft 141 which is journaled at one end in an arm 142, carried by bracket 111, and at the other end in a bracket arm 143 secured to bracket 111. A spur wheel 144, carried on the end of shaft 108, meshes with a pinion 145, carried on the end of governor shaft 141, and affords a driving connection between the timing shaft and the governor mechanism. It will be apparent that the turning of shaft 108 under the action of weight 129 will be regulated by fan 139.

The governor mechanism is normally held against rotation by a coin-controlled latch 16 shown in Figs. 3 and 5. The bracket arm 143 is provided with a forwardly extending portion 146, and pivoted to the forward end of this forwardly extending portion 146 is a latch lever 147 which carries a stud 148 which projects through an opening 149 in bracket arm 143, said opening being considerably larger than the stud to permit movement of the latter with lever 147. As shown in Fig. 3, stud 148 normally engages a lip 151 carried by a stop arm 152, the latter being rigid with governor shaft 141, thereby preventing rotation of the governor mechanism, it being noted that governor shaft 141 tends to turn in a counter-clockwise direction, viewing Fig. 5, to hold lip 151 against stud 148.

The coin-actuated means for releasing the latch mechanism just described comprises; a coin-tripped lever 153, fulcrumed at 154 on plate 36, and a connecting rod 155, connecting said lever with the free end of latch lever 147. One end of lever 153 carries a rod 156, the free end of which carries a plate 157 which lies in the path of a coin introduced through a coin chute 158, the latter connecting at its upper end with the coin slot plate 26. The coin chute is secured to the side wall 31 of the casing by a bracket arm 159. When a coin impinges against plate 157, lever 153 will be pivoted in a counterclockwise direction, viewing Fig. 3, thereby lowering latch lever 147 sufficiently to allow lip 151 to clear stud 148. As the coin slides off from plate 157, it falls through a funnel 161 to a cash box 162, access to the latter being had through a door 163 provided with a lock 164 (Fig. 6). The governor mechanism is thus freed for operation through the medium of a coin, whereupon shaft 108 is free to turn to effect the operations presently to be described.

Lever 153 is only momentarily lowered by the impinging of a coin against plate 157, and hence, it is necessary to provide means for holding stud 148 out of the path of movement of lip 151 until timing shaft 108 has turned sufficiently to effect the printing and ejecting of the ticket. As shown in Fig. 5, a catch lever 165 is pivoted at 166 on bracket arm 143. This lever is of bell crank form, one arm 167 extending upwardly to engage a cam 168, secured to shaft 108, and the other arm 169 extending downwardly and having formed in its free end a notch 171 which hooks over stud 148. A coil spring 172, extending between a forwardly projecting arm portion 173 of lever 165 and arm 146, holds the upper free end of arm 167 against cam 168. When stud 148, which is carried by latch lever 147, is lowered so as to clear lip 151, it falls into notch 171 being thus held down by catch lever 165 to allow the governor mechanism to complete its cycle of movement. Catch lever 165 is tripped to release stud 148 when timing shaft 108 has turned sufficiently to bring cam 168 against arm 167. When catch lever 165 is thus tripped to release stud 148, the latch mechanism is returned to obstructing position under the action of a counter-weight 174 carried on one end of lever 153, stud 148 being returned in this operation so as to engage lip 151 and prevent further rotation of governor shaft 141.

The operations of feeding, severing, printing, ejecting the printed ticket, and taking up the type ribbon, all of which are effected by rotation of timing shaft 108, will now be described, the mechanisms for effecting these several operations being described in the order in which they operate.

A ticket strip 175 (Fig. 11), having individual tickets 176 arranged crosswise of the strip, is stored in a suitable container (not shown) located in the lower portion of the scale upright 23. The strip is preferably arranged in accordion folds in the container to avoid bending the individual tickets. As shown in Fig. 3, the ticket strip 175 is threaded upwardly from the container through a vertically disposed guide plate 177 to a feed spool 178, which is actuated by timing shaft 108 to project the top run of the strip horizontally across bed plate 193, the end ticket of the strip being thus brought to position for printing at the top of printing wheel 41.

The construction of the ticket feeding means is shown in Figs. 4 and 8. Feed spool 178 is mounted for free rotation on a shaft 179 which is secured at its forward end in a collar 181 carried by plate 36. The core of the spool carries enlarged drums 182 to which are secured spool heads 183, the latter being provided at intervals corresponding to the width of a ticket with teeth 184 which engage holes 185 formed in the strip between adjoining tickets. The side portions of the strip are supported on drums 182 and the strip is fed as the spool turns by reason of engagement between teeth 184 and holes 185 in the ticket strip.

The actuating device for feed spool 178 is shown in Figs. 8 and 13 and comprises: a cam 186, carried by shaft 108; a lever 187, fulcrumed at 188 on a bracket arm 189 depending from bed plate 103; an arm 191 mounted for free rotation on spool shaft 179; a ratchet wheel 192 carried by spool head 183; and a link 193 connecting ratchet arm 191 with lever 187. Cam 186 engages a roller 194, carried by the short arm of lever 187, to pivot said lever in a counter-clockwise direction, viewing Fig. 8, thereby lowering link 193 which connects with the long arm of lever 187. Lowering of link 193 causes ratchet arm 191 to turn on shaft 179, which turning effects advance of feed spool 178 by reason of the engagement of a pawl 195 with the teeth of ratchet wheel 192, said pawl being carried by ratchet arm 191 and held in yielding engagement with the teeth of wheel 192 by a coil spring 196. The motion thus imparted to the feed spool 178 advances the ticket strip the width of one ticket. As soon as roller 194 clears cam 186 a coil spring 197, connected at one end to ratchet arm 191 and at the other end to plate 36, immediately returns ratchet arm 191 to position for the next feeding operation. Cam 186 is so positioned on shaft 108 as to actuate this ticket feed means immediately upon the release of the governor mechanism.

As shown in Figs. 3 and 4, the vertical ticket guide plate 177 consists of an inner plate 198, carried by bracket arm 109, and an outer plate 199 which is spaced from plate 198 by strips 201, thereby providing a guide slot through which the strip may be drawn upwardly by feed spool 178. The strip is held against the feed spool 178 by a curved guide plate 202 which is secured to the upper end of guide plate 177. After the strip leaves feed spool 178 it is pushed onto a horizontal guide plate 203, carried by bed plate 103, said plate 203 being provided with marginal strips 204 which form a channel for guiding the strip. As shown in Figs. 4 and 8, a shearing plate or bar 205 is positioned on guide plate 203 at the end of guide strips 204 to receive the strip after it advances through the channel formed by guide strips 204. A pressure plate 206 is secured to guide strips 204 and carries a pair of laterally projecting spring fingers 207 which bear on the ticket strip to hold it firmly against shearing plate 205. The run of the strip lying between feed spool 178 and bed plate 103 is covered by a gate plate 208 which is yieldingly held against the strip by a spring hinge 209, the latter affording a connection between the edge of the gate plate and the adjacent edge of pressure plate 206. The purpose of gate plate 208 is to prevent buckling of the strip as it is pushed forwardly by the feed spool toward bed plate 103. Both bed plate 103 and guide plate 203 are cut away as indicated at 211 to provide an open channel for receiving part of the type ribbon mechanism.

The cut-off mechanism for severing the end ticket from the strip will now be described, this being shown generally in Fig. 3 and in detail in Figs. 9 and 10. It comprises: a rearwardly extending cut-off blade 212, pivoted at 213 on a bracket 214, the latter being secured to shearing plate 205; a spiral cam 215, secured to shaft 108; a bell crank lever 216, pivoted at 217 on a laterally extending plate 218 which is supported through bracket 189 from bed plate 103; and a rod 219 connecting the long arm of bell crank 216 with the free end of cut-off blade 212.

Spiral cam 215 comprises a rim portion 221 from which tapers laterally a cam edge 222, the latter occupying about one-third of the circumference of rim portion 221 and connecting therewith by a sharp shoulder 223. The short arm of bell crank 216 carries a roller 224 which rides on the edge of cam 215 as the latter turns with shaft 108. As roller 224 rides up on cam edge 222, the end ticket will be sheared from the strip by the lowering of cutting blade 212 from the position shown by solid lines in Figs. 9 and 10 to the position shown by the dotted lines in said figures. As cam roller 224 clears shoulder 223 the cut-off blade is quickly returned to inactive position by a coil spring 225 extending between said blade and plate 36. Cam 215 is so positioned on shaft 108 that it will actuate the severing device as soon as the ticket feeding mechanism has advanced the strip so as to position the end ticket with its adjoined edge below the cut-off blade. It will be noted from Fig. 9 that while the ticket strip 175 rests on top of shearing plate 205 the type ribbon 226 is disposed in a channel 227 formed on the under surface of bed plate 103.

After the ticket is severed from the end of the strip, it is printed by being pressed against the type strip 102 carried by printing wheel 41, the mechanism for thus effecting the printing being shown generally in Fig. 3, details thereof being shown in Figs. 5 and 7. This mechanism comprises: an impression hammer 228, mounted for free pivotal movement on a rod 229, the opposite ends of which are journaled in uprights 231 and 232 which project upwardly from a hammer guide plate 233; and a rocker arm 234, pivoted at 235 on a bracket arm 236, the latter being interposed between bed plate 103 and a hanger arm 237 projecting rearwardly from plate 36.

Hammer 228 is actuated from timing shaft 108 through rocker arm 234, said arm being provided at its lower end with a roller 238, which engages a cam plate 239 carried by shaft 108. When the ticket is severed it falls into a depressed or counter-sunk portion 241 (Fig. 4) on bed plate 103 and immediately thereafter cam 239 actuates rocker arm 234, the upper end 242 of which moves downwardly to force impression hammer 228 against the ticket. As will presently be explained, the impression hammer is immediately lifted by spring action to return rocker arm 234 to normal position as soon as roller 238 clears cam 239.

The construction of hammer 228 constitutes one of the novel features of the invention, the design of this part being such as will press the ticket against the type wheel so as to make it conform to the curvature of the wheel and also so as to give uniform printing even though there may be irregularities in the type surface. The hammer consists of a head which is made up of three independently supported sections 243, 244, and 245, which are supported respectively by spring arms 246, 247, and 248, the latter being removably anchored by a screw 249 in a pivot block 251 through which extends shaft 229. Each of the sections 243, 244, and 245 is itself divided into three sections, as shown in Figs. 4 and 5. Spring arm 248 is slit, as indicated at 252 (Fig. 4), to provide three separate finger sections which provide separate supports for the corresponding three divisions of hammer section 245 (Fig. 5). Spring arms 246 and 247 are similarly divided. As shown in Fig. 7, the middle hammer section 244 is slightly wider than the adjacent sections 243 and 245, since this section comes directly over the top of the printing wheel. The impression hammer is thus composed of a group of hammer sections which have more or less independent movement relative to one another, so that the ticket will be pressed against the printing wheel by a surface which more or less conforms to the shape of the wheel itself. This construction gives a more uniform printing than would be obtainable by a hammer head made of a single piece.

Greater uniformity of printing is also obtained by reason of the fact that the ticket is severed from the strip before it is operated upon by the printing instrumentalities. Being thus detached from the remaining tickets of the strip, it may be more readily and uniformly impressed against the face of the printing wheel than would be the case were it still attached along one edge to the remainder of the strip.

Hammer guide plate 233 is secured at one edge to a spacing block 253, carried by bed plate 103, and is provided at its opposite edge with a guide block 254, said block, and also plate 233, being apertured to receive the hammer head, the various sections of which move freely in and are guided by the openings in these pieces. The path of movement of the impression hammer will be apparent from Fig. 7 which shows the normal inoperative position in solid lines and the actuated position in dotted lines. The hammer is lifted to inoperative position by coil spring 255, the lower end of which is secured to spacing block 253 and the upper end of which is secured to pivot block 251. As soon as roller 238 clears cam 239 the hammer is lifted under the action of this spring, rocker shaft 234 being quickly snapped back to inoperative position. As shown in Fig. 4, the counter-sunk portion 241 of bed plate 103 is cut away, as indicated at 256, so that the portion of the ticket upon which the weight is to be recorded may rest directly on type ribbon 226.

Referring next to the ejecting means for pushing the printed ticket from bed plate 103 forwardly into discharge chute 106, reference being had to Figs. 5 and 12, the mechanism will be seen to comprise: a push-out plate 257, which is slidably mounted on bed plate 103; and a push-out lever 258, pivoted at 259 on a bracket arm 261 which depends from bed plate 103. The lower arm of lever 258 carries a roller 262 which is actuated by a cam 263 carried by timing shaft 108. The upper end of said lever extends through a slot 264 formed in bed plate 103, the projecting end thereof engaging a crossbar 265 which constitutes a part of push-out plate 257. Cam 263 is so positioned on shaft 108 that it will throw the upper end of lever 258 forwardly immediately upon the raising of the impression hammer, this movement effecting a shift of push-out plate 257 from the position shown by the dotted lines in Fig. 12 to the position shown by the solid lines in said figure. The push-out plate is guided in its movement by grooves 266 and 267 formed in bed plate 103, and also by a stud 268 which guides a forwardly projecting edge portion of the plate and which also serves as a stop to limit the forward movement thereof. A lip 270 projecting rearwardly from block 254, engages crossbar 265 to aid in the guiding of push-out plate 257. As the rear edge of the printed ticket 260 is engaged by the forward edge of the push-out plate it is moved forwardly from the depression 241 in bed plate 103 and falls through opening 105 in bed plate 103 into chute 106, this movement being clearly shown in Fig. 12. As soon as roller 262 clears push-out cam 263, the push-out plate is returned to normal position by a spring 269, which is connected at its forward end to a lug 271 on said plate, the rear end of said spring being connected to a pin 272 carried by bed plate 103. A stop 270' carried by bed plate 103 limits the return movement of push-out plate 257 under the action of spring 269.

As shown in Figs. 4 and 7, the type ribbon 226 is threaded from a supply spool 273 over the top of printing wheel 41 to a take-up spool 274. Spool 273, as shown in Fig. 8, is rigid on a shaft 275, the forward end of which is journaled in a bracket 276 depending from bed plate 103, the rear end of said shaft being supported on an arm 277 which is secured to arm 189. A knurled finger piece 278 affords means for re-winding the ribbon on spool 273. Spool 273, together with shaft 275, may be removed for replacement of the ribbon, the shaft being undercut at 279 to provide an annular shoulder which holds the shaft in place on arm 277. A leaf spring 281 engages the inner end of shaft 275 to prevent lateral play of the spool. The ribbon take-up spool 274 is rotatably supported on a stub shaft 282 carried by an arm 283 on bed plate 103. The type ribbon is wound on the core of spool 274 from below, so that movement of said spool in a clockwise direction, viewing Fig. 7, will unwind the ribbon from supply spool 273 and will store the used ribbon on the core of takeup spool 274.

The ribbon take-up spool 274 is actuated from the ticket push-out device, the mechanism provided for this purpose being shown in Figs. 3 and 12. It includes a bell crank lever 284 pivoted at 285 on hammer guide plate 233, and a ratchet lever 286 pivotally connected at 287 to one arm of lever 284, and provided at its free end with a pawl 288 which engages the teeth of a ratchet wheel 289, the latter constituting the inner head of take-up spool 274. Bell crank lever 284 is actuated from push-out lever 258 by engagement of the upper end of said push-out lever with a lip 291, carried by one arm of bell crank lever 284, this engagement occurring at about the limit of the forward movement of push-out lever 258. The slight turning of lever 284 thus effected draws ratchet arm 286 toward the right, viewing Fig. 12, sufficiently to advance take-up spool 274 slightly, thereby advancing the ribbon sufficiently to bring a fresh portion opposite the impression hammer. The advance of the ribbon for each actuation of the machine is very slight, it being intended that sufficient ribbon may be carried by spool 273 to provide for the printing of several thousand tickets. After the ribbon has been all used, it may be re-wound by turning supply spool 273 through finger piece 278, the ratchet arm 286 being lifted by grasping a stud 292 to release spool 274 during the re-wind operation. A ribbon guide plate 290 (Fig. 7) is secured to the underface of bed plate 103.

When the several afore-mentioned operations have been completed, time shaft 108 is locked against further turning by a latch mechanism shown in Fig. 8. This mechanism consists of a latch arm 293, pivoted at 294 on an arm 295, the latter being screwed to a bracket 296 mounted on ticket guide plate 177; and a latch disc 297, secured to timing shaft 108 and provided with a peripherally disposed notch 299 for receiving a lip 301 which is carried on the upper end of latch arm 293. A coil spring 302 holds latch arm 293 in latched position to prevent turning of timing shaft 108. This latch is released when the wind-up mechanism is set, a pin 303 striking an apron 304 carried by latch arm 293 to pivot the latter sufficiently to allow lip 301 to clear notch 299. As soon as the governor mechanism is released by a coin, latch disc 297 starts to turn with shaft 108 and lip 301 rides around the periphery of said disc until the operations have been completed whereupon it falls into notch 299 to again lock shaft 108. The latch mechanism just described is of quite heavy construction as compared to the coin-released latch for the governor mechanism. Although timing shaft 108 can not turn until both latches are released, it is desirable to provide a latch of rather substantial construction for normally holding the timing shaft against the action of weight 129 when the parts are in inoperative position.

While the operation of the various parts of the scale mechanism has been set forth in detail in the foregoing description, it is believed that a clearer understanding of the invention will be had by briefly outlining the sequence of operation of the entire scale mechanism.

The position of the parts before a person steps on the platform is as shown in Fig. 3, the weight 129 being in the lowered position, weighing beam 38 being in the raised position, and pull rod 112 for actuating the wind-up mechanism being raised. Printing wheel 41 in this position is set so that the zero mark on type strip 102 is at the top of the wheel directly below impression hammer 278. As soon as a person steps on the weighing platform, the latter preliminarily pivots downwardly to lower pull rod 112 into engagement with lever 113, this movement being imparted through link 116 to gear segment 117 which is turned to raise weight 129 and which is retained in elevated position by engagement of pawl 134 with teeth of ratchet wheel 124, the latter being rigid on shaft 108. In the raised position for weight 129 latch arm 293 is held clear of latch disc 297 by pin 303 carried on gear segment 117. After pull rod 112 has been lowered by this preliminary movement of the scale platform, it is disconnected from lever 113 by reason of the lateral displacement of said pull rod caused by engagement of roller 136 with the upper end 137 of said rod. The wind-up mechanism is thus completely disconnected from the weighing mechanism. The setting of the wind-up mechanism requires from 20 to 30 pounds of weight on the weighing platform. Immediately upon the disconnection of pull rod 112, pull rod 39, which connects with weighing beam 38, is lowered by further movement of the weighing platform, this movement being yieldingly resisted by spring 63. Printing wheel 41 is positioned to bring the number corresponding to the weight of the person opposite impression hammer 228, this movement being effected through the lowering of cam segment 48 from the position shown in Fig. 3 to that shown in Fig. 6, this movement being controlled by the movement of the weighing beam through parts 52, 55 and 57. As soon as printing wheel 41 comes to rest, as indicated to the operator by dial 98 on the front of the scale, a coin is introduced through coin slot plate 26 and falls by gravity through chute 153 to strike plate 157, as shown in Fig. 6, the impact of the coin causing the lowering of rod 155 and the freeing of stud 148 from lip 151 (Fig. 3), thus releasing the governor mechanism 139, 141, 145, and allowing timing shaft 108 to be turned under the action of weight 129. Stud 148 in being lowered by rod 155 falls into notch 171 carried by latch lever 165 (Fig. 5), thus being held clear of lip 151 during rotation of governor shaft 141. The driving connection between weight 129 and shaft 108 consists of gear segment 117, pinion 132, the hub of which carries ratchet arm 133 and pawl 134, and ratchet wheel 124 rigid on shaft 108. As shaft 108 turns the ticket feed spool 178 is first actuated to advance ticket strip 175 the width of a single ticket by engagement of cam 186 with roller 194 carried by lever 187, movement of the latter actuating the ratchet drive for feed spool 178. The end ticket of the strip is projected in this operation between the top of printing wheel 41 and impression hammer 228. Cut-off blade 212 is then lowered to sever the end ticket from the strip, this being effected by turning of bell crank 216 under the action of cam 215. The severed ticket falls into depression 241 formed in bed plate 103 (Fig. 12) with the portion to be printed resting on type ribbon 226. Impression hammer 228 is then lowered to press the ticket against the printing wheel 41 by engagement of cam 239 with roller 238 carried on the lower end of rocker arm 234 (Fig. 5). The hammer is raised as soon as the timing shaft 108 is turned sufficiently to allow roller 238 to clear cam 239. The printed ticket is then pushed from bed plate 103 forwardly into chute 106 by push-out plate 257 (Fig. 12), this plate being pushed forwardly by the upper end of push-out lever 258 which is actuated from timing shaft 108 through cam 263 and roller 262. This operation of the push-out mechanism also advances take-up spool 274 to advance type ribbon 226 a small amount, advance rotation of said spool being effected through ratchet arm 286 and lever 284, which is turned by the upper end of push-out lever 259, as the latter reaches the end of its forward stroke (Fig. 12). After the printed ticket has been ejected governor mechanism 139, 141, 145 is again latched by raising of stud 148 into the path of lip 151 under the action of counter-weight 174 carried by coin-tripped lever 153. Stud 148 is freed from latch lever 165 at this time by cam 168 on timing shaft 108 (Fig. 5). At the same time that the governor mechanism is latched, timing shaft 108 is locked against further rotation by latch arm 293, the lip 301 carried on the upper end thereof falling into notch 299 on latch disc 297. When the person steps off the scale platform, spring 63 raises weighing beam 38 and printing wheel 41 returns to zero position. The several operations of feeding, severing, printing and ejecting the ticket are all timed from shaft 108 which also serves as the actuating means for controlling the operation of these several mechanisms which cooperate to record the weight on the ticket.

The general arrangement of the severing, printing and ejecting devices on bed plate 103, which is positioned at the top of the printing wheel, and the location of timing shaft 108 slightly above the center and to the rear of printing wheel 41, provides a convenient and compact type of construction. Practically all of the mechanism is positioned to the rear of main support plate 36 so that access thereto may be readily had by removing the rear wall of the scale housing. Access to the few parts located in front of plate 36 may be had by removing the upper part of front wall 32.

The foregoing detailed description has been given for clearness of understanding only, and no unnecessary limitations thereof should be understood therefrom, but the appended claims should be construed as broadly as permissible in view of the prior art.

What I regard as new and desire to secure by Letters Patent is:

1. A weighing and ticket-printing scale comprising, in combination: weighing mechanism, including a weighing platform, a printing wheel, and means operated by movement of said platform to position the printing wheel; ticket-printing mechanism comprising type carried by the printing wheel and an impression hammer disposed adjacent said wheel; means for positioning a ticket between said printing wheel and the impression hammer; a coin-controlled timing shaft provided with a cam for actuating the printing mechanism; means automatically controlled from said shaft for ejecting the printed ticket; and means operated by movement of the weighing platform for driving said timing shaft.

2. A weighing and ticket-printing scale comprising, in combination: weighing mechanism, including a weighing platform, a printing wheel, and means operated by movement of said platform to position the printing wheel; ticket-printing mechanism comprising type carried by the printing wheel and an impression hammer disposed adjacent said wheel; feed means for advancing a ticket strip to position the end ticket of the strip adjacent the printing wheel; a severing device for cutting the end ticket from the strip after the positioning thereof adjacent the printing wheel; a coin-controlled timing shaft having cam devices mounted thereon for actuating the ticket feeding, severing, and printing mechanisms; and means operated by movement of the weighing platform for driving said timing shaft.

3. A weighing and ticket-printing scale comprising, in combination: weighing mechanism, including a weighing platform, a printing wheel, and means operated by movement of said platform to position the printing wheel; ticket-printing mechanism comprising type carried by the printing wheel and an impression hammer disposed adjacent said wheel; feed means for advancing a ticket strip to position the end ticket of the strip adjacent the printing wheel; a severing device for cutting the end ticket from the strip after the positioning thereof adjacent the printing wheel; a coin-controlled timing shaft having cam devices mounted thereon constructed and arranged to actuate in progressive sequence the ticket feeding, severing, and printing mechanisms; and means operated by movement of the weighing platform for driving said timing shaft.

4. A weighing and ticket-printing scale comprising, in combination: weighing mechanism, including a weighing platform, a printing wheel, and means operated by movement of said platform to position the printing wheel; ticket-printing mechanism comprising type carried by the printing wheel and an impression hammer disposed adjacent said wheel; feed means for advancing a ticket strip to position the end ticket of the strip adjacent the printing wheel; a severing device for cutting the end ticket from the strip after the positioning thereof adjacent the printing wheel; means for ejecting the printed ticket; a coin-controlled timing shaft having cam devices mounted thereon constructed and arranged to actuate the ticket feeding, severing, printing, and ejecting mechanisms; and means operated by movement of the weighing platform for driving said timing shaft.

5. A weighing and ticket-printing scale comprising, in combination: weighing mechanism, including a weighing platform, a printing wheel, and means operated by movement of said platform to position the printing wheel; ticket-printing mechanism comprising type carried by the printing wheel and an impression hammer disposed adjacent said wheel; feed means for advancing a ticket strip to position the end ticket of the strip adjacent the printing wheel; a severing device for cutting the end ticket from the strip after the positioning thereof adjacent the printing wheel; means for ejecting the printed ticket; a coin-controlled timing shaft having cam devices mounted thereon constructed and arranged to actuate in progressive sequence the ticket feeding, severing, printing, and ejecting mechanism; and means operated by movement of the weighing platform for driving said timing shaft.

6. A weighing and ticket-printing scale comprising, in combination: weighing mechanism, including a weighing platform, a printing wheel, and means operated by movement of said platform to position the printing wheel; ticket-printing mechanism comprising type carried by the printing wheel and an impression hammer disposed adjacent said wheel; means for positioning a ticket between said printing wheel and the impression hammer; a timing shaft provided with a cam for actuating the printing mechanism; means automatically controlled from said shaft for ejecting the printed ticket; means operated by movement of the weighing platform for driving said timing shaft, and coin-controlled governor mechanism for regulating the turning of said timing shaft.

7. A weighing and ticket-printing scale comprising, in combination: weighing mechanism, including a weighing platform, a printing wheel, and means operated by movement of said platform to position the printing wheel; ticket-printing mechanism comprising type carried by the printing wheel, an impression hammer disposed adjacent said wheel, and a type ribbon interposed between said hammer and the wheel; means for positioning a ticket between said printing wheel and the impression hammer; feed means for advancing the type ribbon over the printing wheel; a coin-controlled timing shaft having cam devices mounted thereon for actuating the printing and ribbon feed mechanisms; and means operated by movement of the weighing platform for driving said timing shaft.

8. A weighing and ticket-printing scale comprising, in combination: weighing mechanism, including a weighing platform, a printing wheel, and means operated by movement of said platform to position the printing wheel; ticket-printing mechanism comprising type carried by the printing wheel, an impression hammer disposed adjacent said wheel, and a type ribbon interposed between said hammer and the wheel; feed means for advancing a ticket strip to position the end ticket of the strip adjacent the printing wheel; ribbon feed means for advancing the type ribbon over the printing wheel; a severing device for cutting the end ticket from the strip after the positioning thereof adjacent the printing wheel; a coin-controlled timing shaft having cam devices mounted thereon for actuating the ticket feeding, severing, and printing mechanism, and the ribbon feed means; and means operated by movement of the weighing platform for driving said timing shaft.

9. A weighing and ticket-printing scale comprising, in combination: weighing mechanism, including a weighing platform, a printing wheel, and means operated by movement of said platform to position the printing wheel; ticket-printing mechanism comprising type carried by the printing wheel, an impression hammer disposed adjacent said wheel, and a type ribbon interposed between said hammer and the wheel; feed means for advancing a ticket strip to position the end ticket of the strip adjacent the printing wheel; ribbon feed means for advancing the type ribbon over the printing wheel; a severing device for cutting the end ticket from the strip after the positioning thereof adjacent the printing wheel; a coin-controlled timing shaft having cam devices mounted thereon constructed and arranged to actuate in progressive sequence the ticket feeding, severing, and printing mechanism, and the ribbon feed means; and means operated by movement of the weighing platform for driving said timing shaft.

10. A weighing and ticket-printing scale comprising, in combination: weighing mechanism, including a weighing platform, a printing wheel, and means operated by movement of said platform to position the printing wheel; ticket-printing mechanism comprising type carried by the printing wheel, an impression hammer disposed adjacent said wheel, and a type ribbon interposed between said hammer and the wheel; feed means for advancing a ticket strip to position the end ticket of the strip adjacent the printing wheel; a severing device for cutting the end ticket from the strip after the positioning thereof adjacent the printing wheel; means for ejecting the printed ticket; ribbon feed means operated by said ejecting means for advancing the type ribbon over the printing wheel; a coin-controlled timing shaft having cam devices mounted thereon for actuating the ticket feeding, severing, printing, and ejecting mechanisms; and means operated by movement of the weighing platform for driving said timing shaft.

11. A weighing and ticket-printing scale comprising, in combination: weighing mechanism, including a weighing platform, a printing wheel, and means operated by movement of said platform to position the printing wheel; ticket-printing mechanism comprising type carried by the printing wheel, an impression hammer disposed adjacent said wheel, and a type ribbon interposed between said hammer and the wheel; feed means for advancing a ticket strip to position the end ticket of the strip adjacent the printing wheel; a severing device for cutting the end ticket from the strip after the positioning thereof adjacent the printing wheel; means for ejecting the printed ticket; ribbon feed means operated by said ejecting means for advancing the type ribbon over the printing wheel; a timing shaft having cam devices mounted thereon for actuating the ticket feeding, severing, printing, and ejecting mechanisms; means operated by movement of the weighing platform for driving said timing shaft and coin-operated governor mechanism for regulating the turning of said timing shaft.

12. In a weighing and ticket-printing scale, the combination with a printing wheel, and means operated by the weighing mechanism of the scale for positioning said wheel: of ticket-printing mechanism comprising type carried by the printing wheel; an impression hammer; a pivoted hammer-supporting block positioned adjacent said wheel, said hammer being formed of individual sections disposed circumferentially of the wheel; and spring means carried by said block providing an independently movable support for each individual hammer section.

13. In a weighing and ticket-printing scale: weighing mechanism comprising a printing wheel mounted for rotation in a plane parallel to the front of the scale, a weighing platform, and means operated by movement of said platform for positioning the printing wheel; ticket-printing mechanism comprising type carried by the printing wheel and an impression hammer disposed adjacent the top of said wheel; a discharge chute extending downwardly from a point near the top of the printing wheel to an opening in the front of the scale; means for advancing a ticket strip tangentially toward the printing wheel, whereby to position the end ticket of the strip between said wheel and the impression hammer; means for severing the ticket from the end of the strip; push-out means for displacing the printed ticket forwardly from the top of the printing wheel into the upper end of said discharge chute; a coin-controlled timing shaft positioned adjacent the printing wheel; cam devices carried by said shaft for actuating the ticket feeding, severing, printing, and push-out mechanisms; and means operated by the weighing platform for driving said timing shaft.

14. In a weighing and ticket-printing scale: weighing mechanism comprising a printing wheel mounted for rotation in a plane parallel to the front of the scale, a weighing platform, and means operated by movement of said platform for positioning the printing wheel; ticket-printing mechanism comprising type carried by the printing wheel and an impression hammer disposed adjacent the top of said wheel; a discharge chute extending downwardly from a point near the top of the printing wheel to an opening in the front of the scale; means for advancing a ticket strip tangentially toward the printing wheel, whereby to position the end ticket of the strip between said wheel and the impression hammer; means for severing the ticket from the end of the strip; push-out means for displacing the printed ticket forwardly from the top of the printing wheel into the upper end of said discharge chute; a coin-controlled timing shaft positioned adjacent the printing wheel; cam devices carried by said shaft constructed and arranged to actuate in progressive sequence the ticket feeding, severing, printing, and push-out mechanisms; and means operated by the weighing platform for driving said timing shaft.

15. In a weighing and ticket-printing scale: weighing mechanism, including a weighing platform; printing mechanism comprising a printing wheel and an impression hammer disposed adjacent said wheel; means operated by movement of said platform to position the printing wheel; a gravity-operated wind-up device for actuating the ticket-printing mechanism, said device including a lever, means operatively connecting said lever with the printing mechanism, and a pull rod provided at one end with means affording detachable connection with said lever, the opposite end thereof being operatively connected with the weighing platform; and throw-out means for disconnecting said pull rod from the lever before said platform actuates the weighing mechanism.

16. In a weighing and ticket-printing scale; printing mechanism comprising a printing wheel and an impression hammer disposed adjacent said wheel; means operated by the weighing mechanism of the scale for positioning said wheel; means for advancing a ticket strip to position the end ticket of the strip between said wheel and the impression hammer; means for severing the end ticket from the strip; and coin-controlled means for actuating said severing means and subsequently actuating said ticket printing mechanism.

17. A weighing and ticket-printing scale comprising, in combination: weighing mechanism, including a weighing platform; a printing wheel, and means operated by movement of said platform to position the printing wheel; ticket-printing mechanism comprising type carried by the printing wheel and an impression hammer disposed adjacent said wheel; a coin-controlled timing shaft for actuating the ticket-printing mechanism; gravity-operated wind-up mechanism for driving the timing shaft, said wind-up mechanism including a drive gear provided with a counter-weight, a lever operatively connected with said gear, and a pull rod provided at one end with means affording detachable connection with said lever, the other end thereof having operative connection with the weighing platform; and a throw-out device for disconnecting said pull rod from the lever before said platform actuates the weighing mechanism.

BERT E. MILLS.